US012647752B2

(12) United States Patent
Oh

(10) Patent No.: US 12,647,752 B2
(45) Date of Patent: Jun. 2, 2026

(54) REALTIME INDOOR POSITIONING METHOD USING ARTIFICIAL MAGNETIC FIELD GENERATION AND SYSTEM THEREOF

(71) Applicant: INVENTIS CO., LTD., Seoul (KR)

(72) Inventor: Hoontack Oh, Seongnam-si (KR)

(73) Assignee: INVENTIS CO., LTD., Seoul (KR)

( * ) Notice: Subject to any disclaimer, the term of this patent is extended or adjusted under 35 U.S.C. 154(b) by 288 days.

(21) Appl. No.: 18/618,466

(22) Filed: Mar. 27, 2024

(65) Prior Publication Data

US 2025/0310721 A1      Oct. 2, 2025

(51) Int. Cl.
*H04W 4/024*      (2018.01)
*H04W 4/33*      (2018.01)

(52) U.S. Cl.
CPC ............. *H04W 4/024* (2018.02); *H04W 4/33* (2018.02)

(58) Field of Classification Search
CPC ....................................................... H04W 4/33
See application file for complete search history.

(56) References Cited

U.S. PATENT DOCUMENTS

2009/0121862 A1    5/2009  Young et al.
2019/0170516 A1    6/2019  Moldwin et al.
2024/0125871 A1*   4/2024  Chernyy ................ G01R 33/02

FOREIGN PATENT DOCUMENTS

KR      10-2018-0058191 A      5/2018

OTHER PUBLICATIONS

An Office Action mailed by the Korean Ministry of Intellectual Property on Oct. 22, 2025, which corresponds to Korean Patent Application No. 10-2024-0041714 and is related to U.S. Appl. No. 18/618,466.

* cited by examiner

*Primary Examiner* — Curtis B Odom
(74) *Attorney, Agent, or Firm* — Studebaker Brackett PLLC

(57)      ABSTRACT

According to an embodiment of the present disclosure, an indoor positioning system may include a magnetic field generation device configured to periodically generate an artificial magnetic field and propagate the artificial magnetic field to an indoor space through a conducting wire, a control device configured to adjust characteristics of the artificial magnetic field, control an operation of the magnetic field generation device, and store pattern information about the artificial magnetic field according to a location of the artificial magnetic field on the conducting wire, and a user terminal including a geomagnetic sensor, the user terminal being configured to detect, by using the geomagnetic sensor, the artificial magnetic field propagated through the conducting wire, compare a result of the detection of the artificial magnetic field with the pattern information, and measure, based on a result of the comparison, location information about a user in the indoor space.

20 Claims, 5 Drawing Sheets

REALTIME INDOOR POSITIONING METHOD USING ARTIFICIAL MAGNETIC FIELD GENERATION AND SYSTEM THEREOF

TECHNICAL FIELD

The present disclosure relates to a real-time indoor positioning method using artificial magnetic field generation and a system therefor, and more particularly, to a method of measuring location information about a user in real time by comparing the detection result of a generated artificial magnetic field with magnetic field pattern information according to the location of the artificial magnetic field on a conducting wire.

BACKGROUND

For indoor positioning methods based on the Earth's magnetic field, a method of creating a magnetic field map with characteristics of the Earth's magnetic field according to the location and characteristics of a magnetic field of steel frames or steel structures within a building and then backtracking the location according to the movement of a user has been widely used. To achieve this, similar to Wi-Fi or Bluetooth fingerprinting methods, collection work to create a magnetic field map needs to be conducted before positioning, and thus, the location may be found only after a certain amount of user data is collected. Also, the indoor positioning methods as described above are greatly affected by the surrounding electromagnetic wave generation environment, which may be a disadvantage. Accordingly, real-time indoor positioning methods that do not require the collection of user data and the creation of a magnetic field map and are less affected by the surrounding environment are required.

PRIOR ART DOCUMENT

Patent Document (Patent Document 0001) Publication of Patent No. 10-2018-0058191 (Publication date: May 31, 2018)

DETAILED DESCRIPTION

Object

A technical problem to be solved through embodiments of the present disclosure is to provide a method of measuring location information about a user in an indoor space in real time by using a geomagnetic sensor and an inertial sensor mounted on a user terminal, such as a smartphone, through an artificial magnetic field periodically generated by a magnetic field generation device.

In addition, a technical problem to be solved through the embodiments of the present disclosure is to provide a method of measuring location information about a user in real time by using a conducting wire and a magnetic field generation device, which may be installed in an indoor space, without prior collection work to create a magnetic field map.

Means

According to an embodiment of the present disclosure, an indoor positioning system may include a magnetic field generation device configured to periodically generate an artificial magnetic field and propagate the artificial magnetic field to an indoor space through a conducting wire, a control device configured to adjust characteristics of the artificial magnetic field, control an operation of the magnetic field generation device, and store pattern information about the artificial magnetic field according to a location of the artificial magnetic field on the conducting wire, and a user terminal including a geomagnetic sensor, the user terminal being configured to detect, by using the geomagnetic sensor, the artificial magnetic field propagated through the conducting wire, compare a result of the detection of the artificial magnetic field with the pattern information, and measure, based on a result of the comparison, location information about a user in the indoor space.

In an embodiment, the artificial magnetic field generated by the magnetic field generation device may be one of a pulse magnetic field, a sinusoidal magnetic field, or a static magnetic field.

In an embodiment, the conducting wire may be a grid-type conducting wire.

In an embodiment, the pattern information may be about the artificial magnetic field corresponding to each grid point of the grid-type conducting wire, and the user terminal may be configured to identify a grid point corresponding to a location of the user by comparing the result of the detection with the pattern information, and measure the location information about the user by using a result of the identification.

In an embodiment, the comparing of the result of the detection of the artificial magnetic field with the pattern information may include calculating a similarity between a pattern of the artificial magnetic field corresponding to the result of the detection and a pattern stored as the pattern information, and the user terminal may be configured to identify, as a location of the user, a location of the artificial magnetic field on the conducting wire where the calculated similarity is the highest, and measure the location information about the user by using a result of the identification.

In an embodiment, the control device may be configured to adjust the characteristics of the artificial magnetic field through at least one of amplitude modulation, frequency modulation, or phase modulation.

In an embodiment, the user terminal may further include an inertial sensor and is configured to detect a movement direction of the user by using the inertial sensor, and correct a result of the measurement of the location information by using a result of the detection of the movement direction.

In an embodiment, the user terminal may be configured to display a user interface configured to display in real time the location information about the user and location information about another user who is located in the same indoor space as the user, and the user interface may be configured to provide a navigation function and a communication function between the user and the other user.

According to another embodiment of the present disclosure, an indoor positioning method may be performed by a computing device and may include detecting, by using a geomagnetic sensor, an artificial magnetic field propagated through a conducting wire in an indoor space, comparing a result of the detection of the artificial magnetic field with pattern information about the artificial magnetic field according to a location of the artificial magnetic field on the conducting wire, and measuring, based on a result of the comparison, location information about the user in the indoor space.

In an embodiment, the artificial magnetic field may be one of a pulse magnetic field, a sinusoidal magnetic field, or a static magnetic field.

In an embodiment, the conducting wire may be a grid-type conducting wire.

In an embodiment, the pattern information may be about the artificial magnetic field corresponding to each grid point of the grid-type conducting wire, and the measuring may include identifying a grid point corresponding to a location of the user by comparing a result of the detection with the pattern information, and measuring the location information about the user by using a result of the identification.

In an embodiment, the measuring may include detecting a movement direction of the user by using an inertial sensor, and correcting a result of the measurement of the location information by using a result of the detection of the movement direction.

In an embodiment, the indoor positioning method may further include displaying a user interface configured to display in real time the location information about the user and location information about another user who is located in the same indoor space as the user, wherein the user interface may be configured to provide a navigation function and a communication function between the user and the other user.

According to another embodiment of the present disclosure, a computing device may include a communication interface, a processor, and a memory storing instructions, wherein, when executed by the processor, the instructions may be configured to allow the processor to perform detecting, by using a geomagnetic sensor, an artificial magnetic field propagated through a conducting wire in an indoor space, comparing a result of the detection of the artificial magnetic field with pattern information about the artificial magnetic field according to a location of the artificial magnetic field on the conducting wire, and measuring, based on a result of the comparison, location information about the user in the indoor space.

In an embodiment, the artificial magnetic field may be one of a pulse magnetic field, a sinusoidal magnetic field, or a static magnetic field.

In an embodiment, the conducting wire may be a grid-type conducting wire.

In an embodiment, the pattern information may be about the artificial magnetic field corresponding to each grid point of the grid-type conducting wire, and the measuring may include identifying a grid point corresponding to a location of the user by comparing a result of the detection with the pattern information, and measuring the location information about the user by using a result of the identification.

In an embodiment, the measuring may include detecting a movement direction of the user by using an inertial sensor, and correcting a result of the measurement of the location information by using a result of the detection of the movement direction.

In an embodiment, when executed by the processor, the instructions may be further configured to allow the processor to perform displaying a user interface configured to display in real time the location information about the user and location information about another user who is located in the same indoor space as the user, wherein the user interface is configured to provide a navigation function and a communication function between the user and the other user.

DESCRIPTION OF EMBODIMENTS

Figure 1:
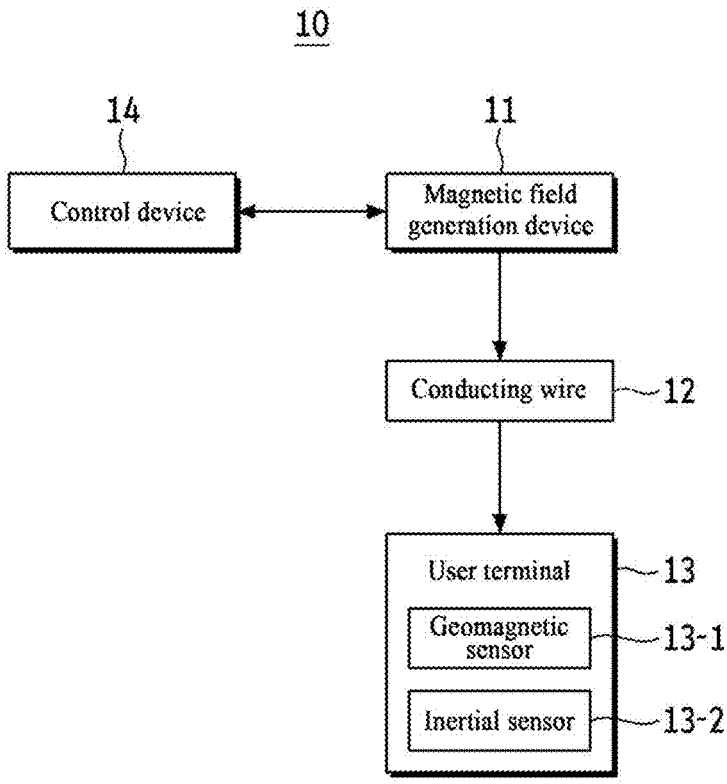
FIG. 1 is a block diagram illustrating the configuration of an indoor positioning system using artificial magnetic field generation, according to an embodiment of the present disclosure.

Hereinafter, embodiments of the present disclosure are described in detail with reference to the accompanying drawings. The advantages and features of the present disclosure and methods of achieving the advantages and features will become apparent with reference to embodiments of the present disclosure described in detail below with reference to the accompanying drawings. The present disclosure may, however, be embodied in many different forms but should not be construed as being limited to the embodiments set forth herein; rather, the present embodiments are provided so that the present disclosure will be thorough and complete, and will fully convey the concept of the disclosure to those of ordinary skill in the art. The scope of the present disclosure is only defined in the claims.

When adding reference numerals to components in the drawings, it should be noted that like components are given like reference numerals as much as possible even if the components are shown in different drawings. Also, in the description of the present disclosure, when it is determined that a detailed description of a related well-known component or function may obscure the gist of the present disclosure, the detailed description will be omitted.

Unless otherwise defined, all terms (including technical and scientific terms) used herein may be used with meanings that are commonly understood by those of ordinary skill in the art. In addition, terms defined in commonly used dictionaries are not ideally or excessively interpreted unless explicitly and specifically defined otherwise. Terms used herein are merely to describe embodiments of the present disclosure and do not limit the present disclosure. As used herein, the singular forms include the plural forms as well, unless the context specifically states otherwise.

Also, in the description of components in the present disclosure, terms such as first, second, A, B, (a), and (b) may be used. These terms are only used to distinguish one component from another. The nature, sequence, or order of the components is not limited by the terms. It will be understood that when a component is referred to as being "connected" or "coupled" to another component, the component may be directly connected or coupled to the other component, but the component may also be "connected" or "coupled" to the other component with another intervening component therebetween.

As used herein, the terms "comprises" and/or "comprising" mean that aforementioned components, steps, operations, and/or devices do not exclude the presence or addition of one or more components, steps, operations, and/or devices.

FIG. 1 is a block diagram illustrating the configuration of an indoor positioning system (10) using artificial magnetic field generation, according to an embodiment of the present disclosure. Referring to FIG. 1, the indoor positioning system (10) according to an embodiment of the present disclosure may include a magnetic field generation device (11), a conducting wire (12), a user terminal (13), and a control device (14). Under the control of the control device (14), the magnetic field generation device (11) may generate an artificial magnetic field and propagate the artificial magnetic field to an indoor space through the conducting wire (12), and the user terminal (13) may detect the propagated artificial magnetic field by using a sensor and then measure location information about a user by matching a result of the detection to a location of the artificial magnetic field on the conducting wire.

The magnetic field generation device (11) may periodically generate an artificial magnetic field under the control of the control device (14). In this case, characteristics (e.g., amplitude, frequency, and phase of a magnetic field) of the artificial magnetic field may be preset or adjusted in real time by the control device (14). The magnetic field generation device (11) may propagate, through the conducting wire (12), the artificial magnetic field to an indoor space where the user is located, the artificial magnetic field being periodically generated as described above. For example, the magnetic field generation device (11) may be installed on the ceiling of an indoor space, but the present disclosure is not limited thereto. The magnetic field generation device (11) may also be installed at any other location suitable for a magnetic field to propagate. Hereinafter, the configuration of the magnetic field generation device (11) will be described in detail with reference to FIG. 2.

Figure 2:
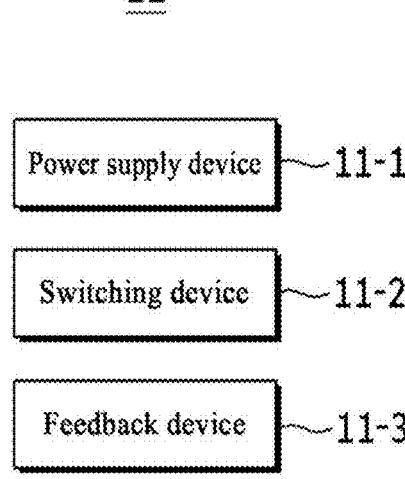
FIG. 2 is a block diagram illustrating the configuration of a magnetic field generation device of FIG. 1.

FIG. 2 is a block diagram illustrating the configuration of the magnetic field generation device (11) of FIG. 1. Referring to FIG. 2, the magnetic field generation device (11) may include a power supply device (11-1), a switching device (11-2), and a feedback device (11-3). The power supply device (11-1) may provide a voltage or current required to generate a magnetic field. For example, the magnitude and duration of the magnetic field may be adjusted by adjusting the magnitude of the voltage or current provided from the power supply device (11-1). The switching device (11-2) may generate pulses by quickly turning on and off the flow of current. For example, the switching device (11-2) may be implemented by using a transistor. The feedback device (11-3) may detect characteristics of the generated magnetic field in real time and provide a result of the detection to the control device (14). To this end, the feedback device (11-3) may include a magnetic field sensor.

Also, the magnetic field generation device (11) may further include a conductor (e.g., a coil or a solenoid) used to generate a magnetic field, and a cooling device for removing heat generated due to high current or high voltage. In addition, the magnetic field generation device (11) of FIG. 2 is shown based on a component configured to generate a pulse magnetic field, but the present disclosure is not limited thereto. As described above, the magnetic field generation device (11) may be implemented to include a component configured to generate a sinusoidal magnetic field or a static magnetic field. In this case, in addition to the switching device (11-2), the magnetic field generation device (11) may include components necessary for generating a sinusoidal magnetic field or a static magnetic field.

Referring back to FIG. 1, the conducting wire (12) allows the artificial magnetic field generated by the magnetic field generation device (11) to propagate to a wider area of the indoor space. In other words, the conducting wire (12) may function as a medium through which the artificial magnetic field may propagate. For example, the conducting wire (12) may be implemented as a grid-type conducting wire or may be implemented as a wire-type antenna. For clarity of description, embodiments in which the conducting wire (12) is a grid type are mainly described below, but the present disclosure is not limited thereto. The conducting wire (12) may be implemented in a form other than a grid-type conducting wire or an antenna.

When the conducting wire (12) is a grid type, the generated artificial magnetic field may propagate to each grid point of the grid-type conducting wire. At each grid point, the magnitude and direction of the artificial magnetic field may vary uniquely. That is, at each grid point, the artificial magnetic field may exhibit a unique pattern. The pattern of the artificial magnetic field may vary according to the physical arrangement of the grid and electrical characteristics of the conducting wire. Information related to the pattern of the artificial magnetic field at each grid point may be stored in the control device (14).

In contrast, when the conducting wire (12) is a wire-type antenna, the generated artificial magnetic field may intensively propagate to a desired space in a specific direction. Similarly, even in this case, information related to the pattern of the artificial magnetic field at each point where the artificial magnetic field propagates may be stored in the control device (14).

For example, the conducting wire (12) may be installed under the magnetic field generation device (11), which is located on the ceiling of an indoor space. However, the present disclosure is not limited thereto. The conducting wire (12) may be installed anywhere where an artificial magnetic field may efficiently propagate to a space where indoor positioning is to be performed. Also, the conducting wire (12) may be implemented by being integrated into the magnetic field generation device (11) or may be implemented separately.

The user terminal (13) may detect the artificial magnetic field propagated through the conducting wire (12), compare a result of the detection with pattern information according to the location of the artificial magnetic field stored in the control device (14), and measure location information about the user in the indoor space. To this end, the user terminal (13) may include a geomagnetic sensor (13-1) for detecting changes in the magnetic field and an inertial sensor (13-2) for detecting a movement and direction of the user.

The user terminal (13) may detect the propagated artificial magnetic field by using the geomagnetic sensor (13-1) and detect a movement direction of the user by using the inertial sensor (13-2). As described above, a result of the detection of the artificial magnetic field may be compared with pattern information about the artificial magnetic field according to the location and used to measure the location information about the user. In more detail, the user terminal (13) may calculate a similarity between a pattern of the detected artificial magnetic field and a pattern of the artificial magnetic field for each location stored in the control device (14), and identify, as a location of the user, a location of the artificial magnetic field on the conducting wire where the calculated similarity is the highest.

When the conducting wire (12) is a grid type, the pattern information corresponds to pattern information about the artificial magnetic field corresponding to each grid point of the grid-type conducting wire, a grid point corresponding to the location of the user may be identified by comparing the result of the detection of the artificial magnetic field with the pattern information, and the location information about the user may be measured through a result of the identification. In addition, a result of the detection of the movement direction may be used to correct the measured location information. As described above, the accuracy of indoor positioning may be improved by using both results of detection from the geomagnetic sensor (13-1) and the inertial sensor (13-2). Moreover, in some cases, signal strength of wireless communication of the user terminal (13) may provide additional location information.

For example, the user terminal (13) may include a smartphone, a desktop computer, a laptop computer, a tablet computer, or the like. However, the present disclosure is not limited thereto. Any device may be implemented as the user terminal (13). The user terminal (13) may display a user interface that displays in real time the location information about the user and location information about another user who is located in the same indoor space as the user. The user interface may provide a navigation function and a communication function (e.g., a messaging function) between users. When the user terminal (13) is a smartphone, the user interface may be displayed as a portion of an indoor positioning application.

The control device (14) may control an artificial magnetic field generation operation by communicating with the magnetic field generation device (11). In detail, the control device (14) may adjust the characteristics of the generated artificial magnetic field. For example, the characteristics of the artificial magnetic field may include amplitude, frequency, and phase of the magnetic field. The control device (14) may adjust the characteristics of the magnetic field and change a waveform of the magnetic field by using amplitude modulation (AM), frequency modulation (FM), and phase modulation (PM). As described above, the control device (14) may increase the identifiability of magnetic field patterns and reduce the influence of surrounding noise, by changing the waveform of the generated artificial magnetic field.

Also, as described above, the control device (14) may store pattern information about the artificial magnetic field according to the location of the artificial magnetic field on the conducting wire (12). For example, when the conducting wire (12) is a grid type, the pattern information may be about the artificial magnetic field corresponding to each grid point. The control device (14) may provide the pattern information by communicating with the user terminal (13) and allow the user terminal (13) to compare the result of the detection of the artificial magnetic field with the pattern information.

The control device (14) may be implemented as at least one computing device. For example, all functions of the control device (14) may be implemented in a single computing device, a first function of the control device (14) may be implemented in a first computing device, and a second function may be implemented in a second computing device. Alternatively, a specific function of the control device (14) may be implemented in a plurality of computing devices. For example, the computing device may include any type of device including a calculation means and a communication means. Alternatively, the control device (14) may be configured by using one or more physical servers included in a server farm based on cloud technology such as a virtual machine.

In addition, the magnetic field generation device (11), the user terminal (13), and the control device (14), which are shown in FIG. 1, may communicate with each other through all types of wired/wireless networks (not shown), such as a local area network (LAN), a wide area network (WAN), a mobile radio communication network, and wireless broadband Internet (WiBro).

Figure 3:
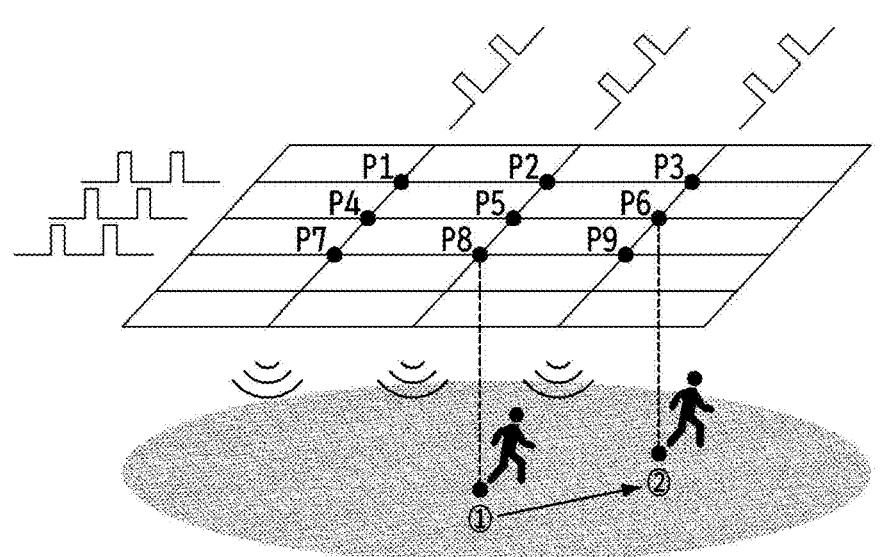
FIG. 3 is a conceptual diagram illustrating an indoor positioning method using an artificial magnetic field and a grid-type conducting wire, according to an embodiment of the present disclosure.

FIG. 3 is a conceptual diagram illustrating an indoor positioning method using an artificial magnetic field and a grid-type conducting wire, according to an embodiment of the present disclosure. Referring to FIG. 3, a grid-type conducting wire through which a pulse magnetic field propagates, and grid points (P1-P9) on the grid-type conducting wire are shown. In this case, a location of a user with the user terminal (13) is assumed to change from ① to ②.

As described above, the user terminal (13) may detect an artificial magnetic field through a geomagnetic sensor. In this case, a result of detection of the artificial magnetic field may be compared with pattern information for each of the grid points (P1-P9) stored in the control device (14). When the user is located at ①, pattern information most similar to a pattern of the detected artificial magnetic field is pattern information about a grid point (P8), and when the user is located at ②, pattern information most similar to the pattern of the detected artificial magnetic field is pattern information about a grid point (P6).

Accordingly, when the user is located at ①, the grid point (P8) may be identified as the location of the user, and when the user is located at ②, the grid point (P6) may be identified as the location of the user. Therefore, indoor positioning of the user may be performed in real time by detecting the artificial magnetic field propagated through the grid-type conducting wire.

Figure 4:
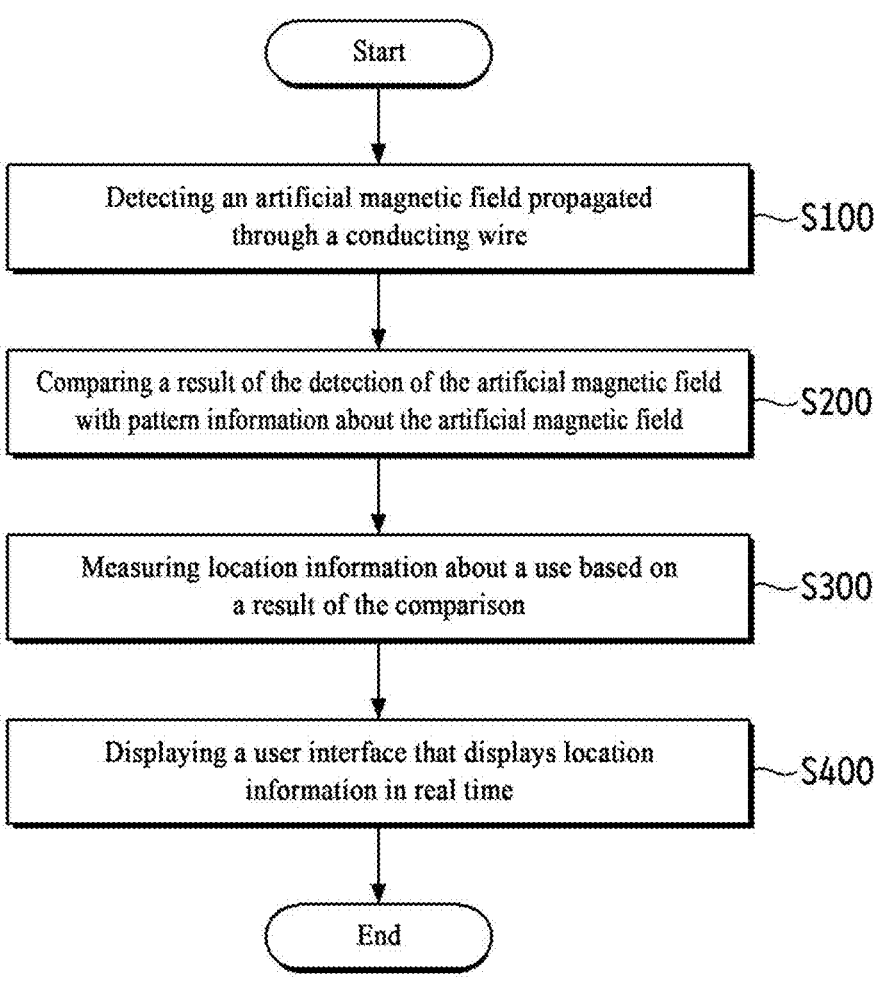
FIG. 4 is a flowchart illustrating an indoor positioning method using artificial magnetic field generation, according to an embodiment of the present disclosure.

FIG. 4 is a flowchart illustrating an indoor positioning method using artificial magnetic field generation, according to an embodiment of the present disclosure. For reference, the following descriptions represent steps/operations of a user context propagation method performed by the user terminal (13). Accordingly, in the following descriptions, when the subject of a specific step/operation is omitted, it may be understood that the specific step/operation is performed by the user terminal (13) of FIG. 1. Hereinafter, the descriptions will be made with reference to FIG. 1 along with FIG. 4.

In step S100, an artificial magnetic field propagated through the conducting wire (12) may be detected. In this case, the artificial magnetic field may be one of a pulse magnetic field, a sinusoidal magnetic field, and a static magnetic field. Also, the conducting wire (12) may be a grid-type conducting wire or may be a wire-type antenna. In step S200, a result of the detection of the artificial magnetic field using the geomagnetic sensor (13-1) of the user terminal (13) may be compared with pattern information about an artificial magnetic field stored in an external source (e.g., the control device (14)). In this case, the comparison between the result of the detection and the pattern information may be performed by calculating a similarity between a pattern corresponding to the result of the detection and the pattern information.

In step S300, location information about a user may be measured based on a result of the comparison. For example, a location of the artificial magnetic field on the conducting wire where the similarity between the pattern corresponding to the result of the detection and the pattern information is calculated to be the highest may be identified as the location of the user. Hereinafter, embodiments related to step S300 will be further described.

Figure 5:
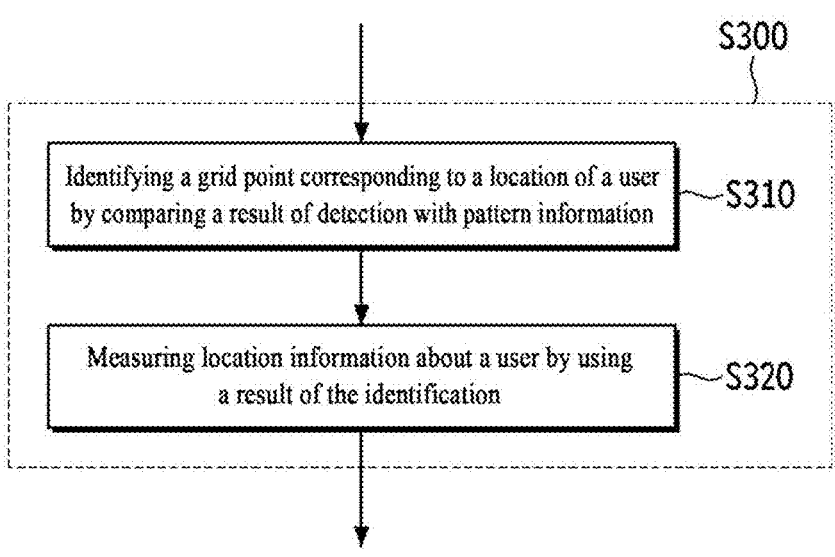
FIG. 5 is a flowchart illustrating an embodiment of measuring location information of FIG. 4.

FIG. 5 is a flowchart illustrating an embodiment of a step (S300) of measuring location information of FIG. 4. FIG. 5 shows an embodiment in which the conducting wire (12) is a grid type. Referring to FIG. 5, in step S310, the result of the detection may be compared with the pattern information, and a grid point corresponding to the location of the user may be identified. When the conducting wire (12) is a grid type, the pattern information represents a pattern of the artificial magnetic field corresponding to each grid point. Accordingly, a grid point where the similarity with the pattern corresponding to the result of the detection is the highest may be identified as the location of the user. In step S320, the location information about the user may be measured by using a result of the identification.

Figure 6:
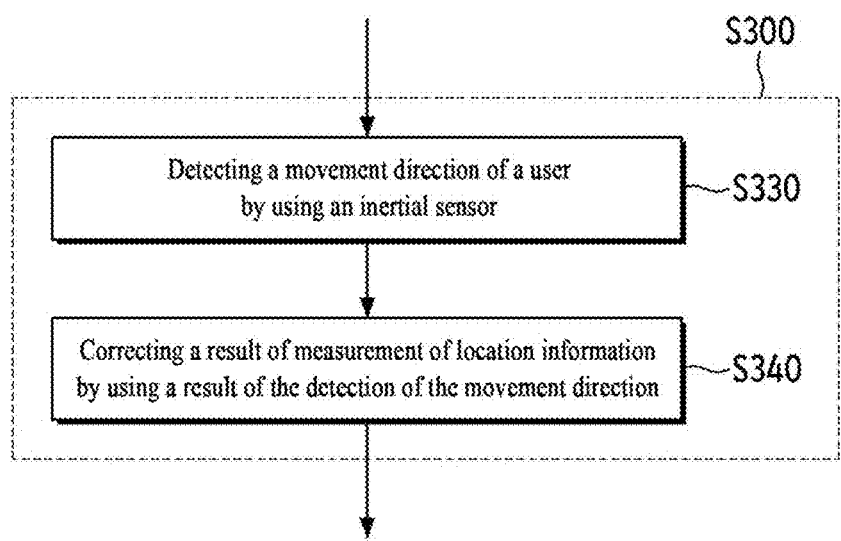
FIG. 6 is a flowchart illustrating another embodiment of measuring location information of FIG. 4.

FIG. 6 is a flowchart illustrating another embodiment of a step (S300) of measuring location information of FIG. 4. Referring to FIG. 6, in step S330, a movement direction of the user may be detected by using the inertial sensor (13-2) of the user terminal (13). Then, in step S340, a result of the measurement of the location information may be corrected by using a result of the detection of the movement direction.

Referring back to FIG. 4, in step S400, a user interface that displays the location information in real time may be displayed on the user terminal (13). As described with reference to FIG. 1, the user interface displayed in step S400 may display in real time the location information about the user and location information about another user who is located in the same indoor space as the user, and may provide a navigation function and a communication function between users.

Figure 7:
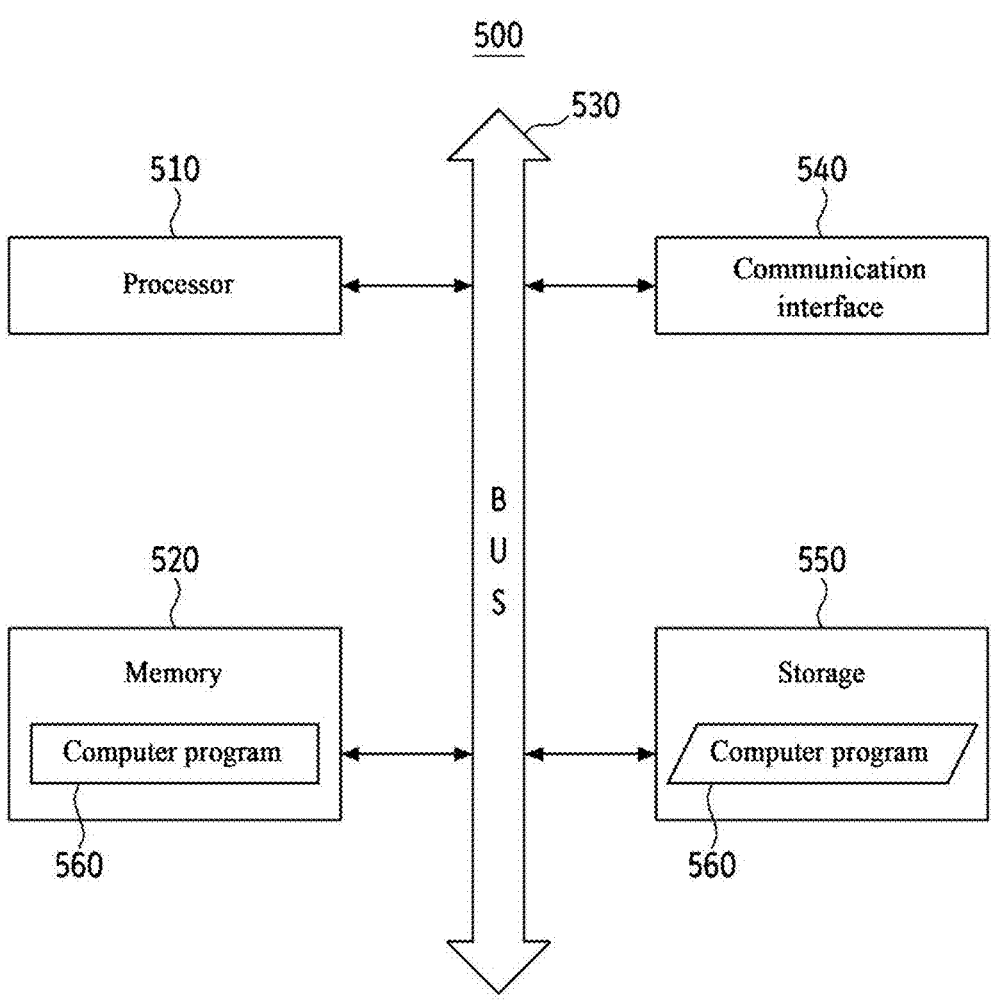
FIG. 7 is a block diagram illustrating a hardware configuration of a computing device for performing an indoor positioning method, according to an embodiment of the present disclosure.

FIG. 7 is a block diagram illustrating a hardware configuration of a computing device (500) for performing an indoor positioning method, according to an embodiment of the present disclosure.

The computing device (500) may include at least one processor (510), a bus (530), a communication interface (540), a memory (520) that loads a computer program performed by the processor (510), and a storage (550) storing a computer program (560). However, only components related to the embodiment of the present disclosure are shown in FIG. 7. Accordingly, it will be understood by those of ordinary skill in the art that other general-purpose components may be further included in addition to the components shown in FIG. 7. That is, the computing device (500) may further include various components in addition to the components shown in FIG. 7. Also, in some cases, the computing device (500) may be configured without some of the components shown in FIG. 7. Hereinafter, each component of the computing device (500) will be described.

The processor (510) may control all operations of each component of the computing device (500). The processor (510) may be configured to include at least one of a central processing unit (CPU), a microprocessor unit (MPU), a micro control unit (MCU), a graphic processing unit (GPU), or any type of processor well known in the art. Also, the processor (510) may perform calculations on at least one application or program to execute operations/methods according to embodiments of the present disclosure. The computing device (500) may include one or more processors.

Next, the memory (520) may store various types of data, commands, and/or information. The memory (520) may load the computer program (560) from the storage (550) to execute the operations/methods according to the embodiments of the present disclosure. The memory (520) may be implemented as a volatile memory such as random access memory (RAM), but the present disclosure is not limited thereto.

Next, the bus (530) may provide a communication function between components of the computing device (500). The bus (530) may be implemented as various types of buses, such as an address bus, data bus, and control bus.

Next, the communication interface (540) may support wired/wireless Internet communication of the computing device (500). Also, the communication interface (540) may support various communication schemes other than Internet communication. To this end, the communication interface (540) may be configured to include a communication module well known in the art.

Next, the storage (550) may non-temporarily store one or more computer programs (560). The storage (550) may be configured to include a nonvolatile memory, such as read only memory (ROM), erasable programmable ROM (EPROM), electrically erasable programmable ROM (EEPROM), or flash memory, hard disk, removable disk, or any type of computer-readable recording medium well known in the art.

Next, the computer program (560) may include one or more instructions, when loaded into the memory (520), that allow the processor (510) to perform operations/methods according to various embodiments of the present disclosure. That is, the processor (510) may execute the one or more loaded instructions to perform the operations/methods according to various embodiments of the present disclosure.

For example, the computer program (560) may include instructions to detect, by using a geomagnetic sensor, an artificial magnetic field propagated through a conducting wire in an indoor space, compare a result of the detection of the artificial magnetic field with pattern information about the artificial magnetic field according to a location of the artificial magnetic field on the conducting wire, measure, based on a result of the comparison, location information about a user in the indoor space, and display a user interface that displays in real time the location information about the user and location information about another user who is located in the same indoor space as the user.

In addition, the computer program (560) may include instructions to compare the result of the detection with the pattern information, identify a grid point corresponding to a location of the user, and measure the location information about the user by using a result of the identification. Furthermore, the computer program (560) may include instructions to detect a movement direction of the user by using an inertial sensor, and correct a result of the measurement of the location information by using a result of the detection of the movement direction.

According to the embodiments of the present disclosure, a magnetic field generation device and a conducting wire are provided in an indoor space such that, even without collection work to create a magnetic field map, a location of a user may be identified in the indoor space with relatively high accuracy while minimizing the influence of the surrounding environment.

According to the embodiments of the present disclosure, the indoor positioning method may be effectively used to provide pathfinding services to visitors in large indoor spaces, such as shopping malls, museums, and airports, or to provide location-based services in indoor spaces, and may contribute to improving user experience by providing accurate location information even in the indoor spaces.

Also, according to the embodiments of the present disclosure, the positioning method has been mainly described based on indoor positioning, but when a magnetic field generation device and a conducting wire are provided even in an outdoor space, positioning may be performed with higher accuracy than the general positioning method using a global positioning system (GPS). That is, the positioning method according to the embodiments of the present disclosure may be used regardless of being indoors or outdoors.

Various embodiments of the present disclosure and effects resulting from the embodiments have been mentioned with reference to FIGS. 1 to 7. The effects according to the technical idea of the present disclosure are not limited to the effects mentioned above. Other effects not mentioned will be clearly understood by those of ordinary skill in the art from the following descriptions.

In the above, though all the components of the embodiments of the present disclosure have been described as being combined or operating in combination, the present disclosure is not limited to these embodiments. That is, within the scope of the present disclosure, all the components may operate by selectively combining one or more of the components.

Although operations are shown in the drawings in a specific order, it should not be understood that the operations need to be performed in the specific order shown or sequential order or that all the operations shown need to be performed to obtain a desired result. In certain circumstances, multitasking and parallel processing may be advantageous. Moreover, it should not be construed that separations of the various components in the embodiments described above are required. It should be understood that program components and systems described above may generally be integrated into a single software product or may be packaged into a plurality of software products.

Although the embodiments of the present disclosure have been described above with reference to the accompanying drawings, it will be understood by those of ordinary skill in the art that the present disclosure may be implemented in other specific forms without changing the technical idea or essential features thereof. Hence, it will be understood that the above embodiments should be considered in the descriptive sense only and not for purposes of limitation. The scope of protection of the present disclosure should be construed in accordance with the following claims. All technical ideas within the scope of the present disclosure shall be construed as being included within the scope of the present disclosure.

The invention claimed is:

1. An indoor positioning system comprising:

a magnetic field generation device configured to periodically generate an artificial magnetic field and propagate the artificial magnetic field to an indoor space through a conducting wire;

a control device configured to adjust characteristics of the artificial magnetic field, control an operation of the magnetic field generation device, and store pattern information about the artificial magnetic field according to a location of the artificial magnetic field on the conducting wire; and a user terminal including a geomagnetic sensor, the user terminal being configured to detect, by using the geomagnetic sensor, the artificial magnetic field propagated through the conducting wire, compare a result of the detection of the artificial magnetic field with the pattern information, and measure, based on a result of the comparison, location information about a user in the indoor space.

2. The indoor positioning system of claim 1, wherein the artificial magnetic field generated by the magnetic field generation device is one of a pulse magnetic field, a sinusoidal magnetic field, or a static magnetic field.

3. The indoor positioning system of claim 1, wherein the conducting wire is a grid-type conducting wire.

4. The indoor positioning system of claim 3, wherein the pattern information is about the artificial magnetic field corresponding to each grid point of the grid-type conducting wire, and the user terminal is configured to identify a grid point corresponding to a location of the user by comparing the result of the detection with the pattern information, and measure the location information about the user by using a result of the identification.

5. The indoor positioning system of claim 1, wherein the comparing of the result of the detection of the artificial magnetic field with the pattern information comprises calculating a similarity between a pattern of the artificial magnetic field corresponding to the result of the detection and a pattern stored as the pattern information, and the user terminal is configured to identify, as a location of the user, a location of the artificial magnetic field on the conducting wire where the calculated similarity is the highest, and measure the location information about the user by using a result of the identification.

6. The indoor positioning system of claim 1, wherein the control device is configured to adjust the characteristics of the artificial magnetic field through at least one of amplitude modulation, frequency modulation, or phase modulation.

7. The indoor positioning system of claim 1, wherein the user terminal further includes an inertial sensor and is configured to detect a movement direction of the user by using the inertial sensor, and correct a result of the measurement of the location information by using a result of the detection of the movement direction.

8. The indoor positioning system of claim 1, wherein the user terminal is configured to display a user interface configured to display in real time the location information about the user and location information about another user who is located in the same indoor space as the user, and the user interface is configured to provide a navigation function and a communication function between the user and the other user.

9. An indoor positioning method performed by a computing device, the indoor positioning method comprising:

detecting, by using a geomagnetic sensor, an artificial magnetic field propagated through a conducting wire in an indoor space;

comparing a result of the detection of the artificial magnetic field with pattern information about the artificial magnetic field according to a location of the artificial magnetic field on the conducting wire; and measuring, based on a result of the comparison, location information about a user in the indoor space.

10. The indoor positioning method of claim 9, wherein the artificial magnetic field is one of a pulse magnetic field, a sinusoidal magnetic field, or a static magnetic field.

11. The indoor positioning method of claim 9, wherein the conducting wire is a grid-type conducting wire.

12. The indoor positioning method of claim 11, wherein the pattern information is about the artificial magnetic field corresponding to each grid point of the grid-type conducting wire, and the measuring comprises:

identifying a grid point corresponding to a location of the user by comparing a result of the detection with the pattern information; and measuring the location information about the user by using a result of the identification.

13. The indoor positioning method of claim 9, wherein the measuring comprises:

detecting a movement direction of the user by using an inertial sensor; and correcting a result of the measurement of the location information by using a result of the detection of the movement direction.

14. The indoor positioning method of claim 9, further comprising displaying a user interface configured to display in real time the location information about the user and location information about another user who is located in the same indoor space as the user, wherein the user interface is configured to provide a navigation function and a communication function between the user and the other user.

15. A computing device comprising:

a communication interface;

a processor; and a memory storing instructions, wherein, when executed by the processor, the instructions are configured to allow the processor to perform:

detecting, by using a geomagnetic sensor, an artificial magnetic field propagated through a conducting wire in an indoor space;

comparing a result of the detection of the artificial magnetic field with pattern information about the artificial magnetic field according to a location of the artificial magnetic field on the conducting wire; and measuring, based on a result of the comparison, location information about a user in the indoor space.

16. The computing device of claim 15, wherein the artificial magnetic field is one of a pulse magnetic field, a sinusoidal magnetic field, or a static magnetic field.

17. The computing device of claim 15, wherein the conducting wire is a grid-type conducting wire.

18. The computing device of claim 17, wherein the pattern information is about the artificial magnetic field corresponding to each grid point of the grid-type conducting wire, and the measuring comprises:

identifying a grid point corresponding to a location of the user by comparing a result of the detection with the pattern information; and measuring the location information about the user by using a result of the identification.

19. The computing device of claim 15, wherein the measuring comprises:

detecting a movement direction of the user by using an inertial sensor; and correcting a result of the measurement of the location information by using a result of the detection of the movement direction.

20. The computing device of claim 15, wherein, when executed by the processor, the instructions are further configured to allows the processor to perform displaying a user interface configured to display in real time the location information about the user and location information about another user who is located in the same indoor space as the user, wherein the user interface is configured to provide a navigation function and a communication function between the user and the other user.

* * * * *